June 27, 1939.  E. L. ALLEN  2,163,577
ANIMAL TRAP
Filed Sept. 21, 1937  2 Sheets-Sheet 2
FIG. 3.
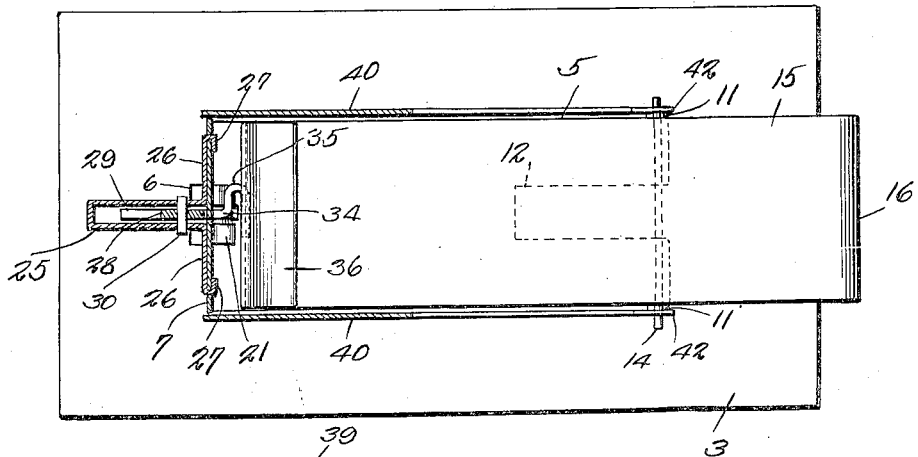
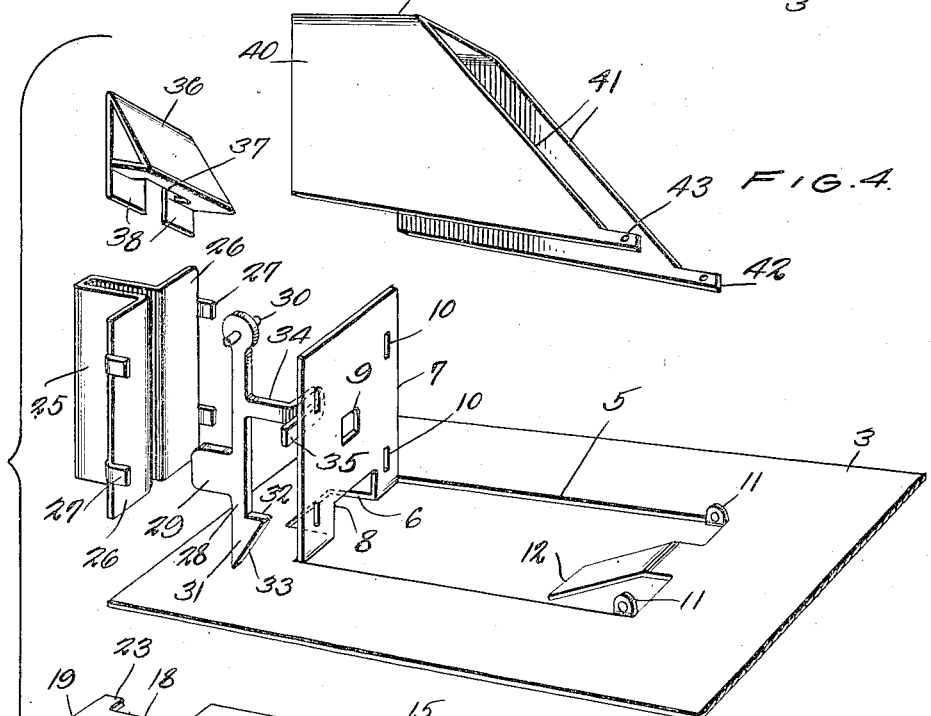
E. L. ALLEN
INVENTOR.
BY *C. A. Snowdles*
ATTORNEYS.

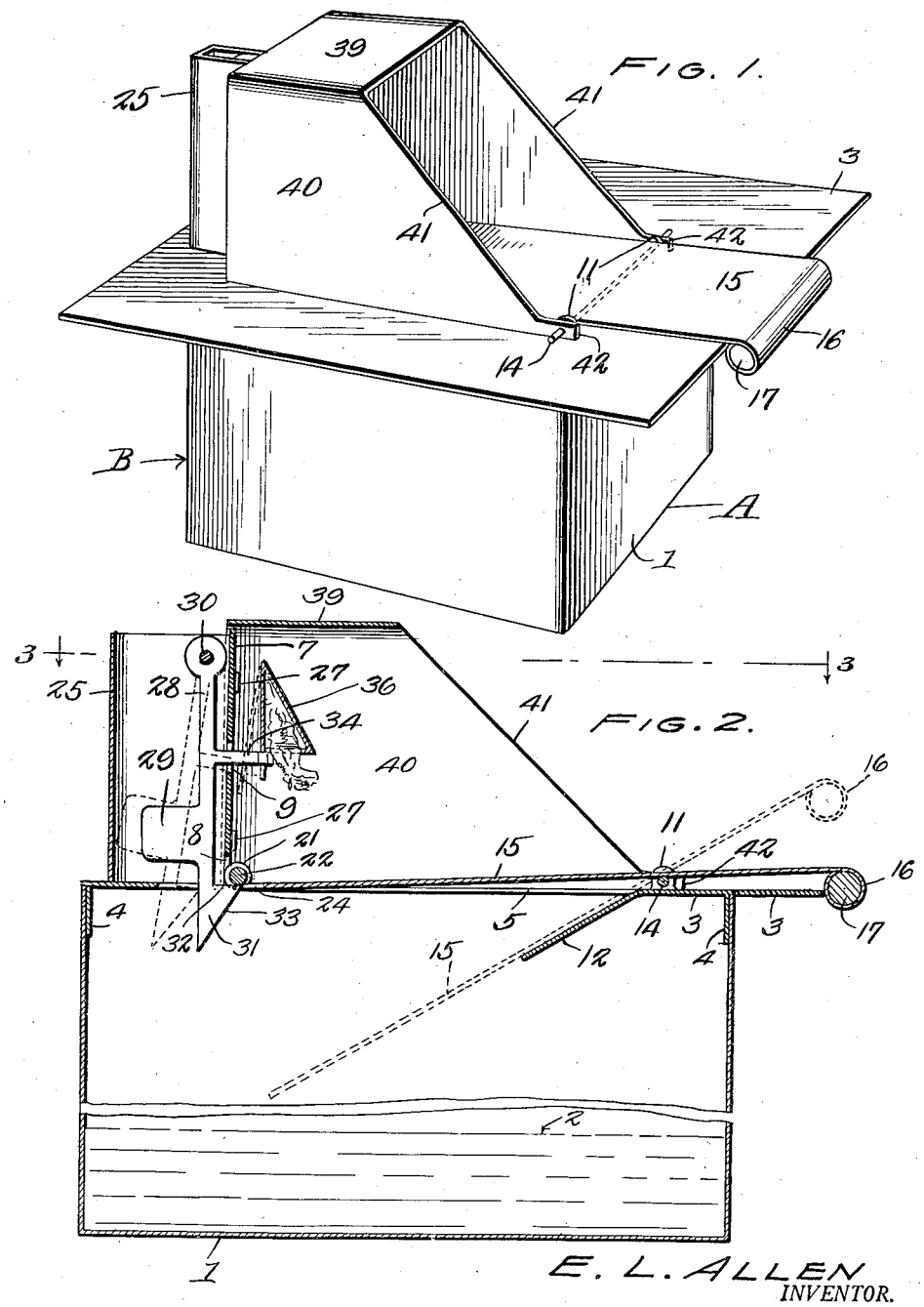

Patented June 27, 1939

2,163,577

UNITED STATES PATENT OFFICE 2,163,577

ANIMAL TRAP

Edward L. Allen, Tampa, Fla.

Application September 21, 1937, Serial No. 164,974

3 Claims. (Cl. 43—70)

The device forming the subject matter of this application is a trap, of that general type in which a tiltable platform is released to drop a mouse, rat or other animal into a receptacle. The invention aims to provide a novel trigger mechanism, novel means for mounting the tiltable platform, novel means for assembling an enclosure member with the trap, a novel bait receptacle and means for mounting it: and, generally, to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows, in perspective, a device constructed in accordance with the invention;

Fig. 2 is a vertical longitudinal section;

Fig. 3 is a horizontal section on the line 3—3 of Fig. 2;

Fig. 4 is a composite perspective showing the parts of the trap separated.

The device forming the subject matter of this application preferably is made of metal throughout. In order to define the relative locations of parts, that end of the device which is marked by the letter A in Fig. 1 will be considered the forward end, the rear end being designated by the letter B.

In carrying out the invention, there is provided a box-like receptacle 1, which may be a tank containing water 2. On the receptacle 1 rests a lid 3, which may be called a support, since it carries the working parts of the device. Any suitable means may be provided for holding the lid 3 detachably on the receptacle 1. If preferred, the lid 3 may have depending lips 4, engaging the end walls of the receptacle 1, and fitting between the side walls thereof.

In the lid 3 there is an opening 5 having a reduced rear extension 6. Part of the material freed in the forming of the opening 5 is turned up at right angles to the lid 3, at the rear end of the opening 5, to form the end wall 7 of an enclosure member which will be described hereinafter. In the lower end of the wall 7 there is a notch 8. The wall 7 is provided with a central hole 9, and about the hole 9, the wall 7 is supplied with slots 10. The lid 3 has upwardly extended ears or bearings 11, located at the forward end of the opening 5. The lid 3 is equipped with a downwardly and rearwardly inclined stop tongue 12, located between the ears 11 at the forward end of the opening 5.

In the bearings or ears 11, a shaft 14 is mounted to rock, the shaft being secured to the intermediate portion of a platform 15, nearer to the forward end of the platform than to the rear end thereof. The platform 15 is so constructed that its forward end can tilt downwardly and rest on the lid 3, as shown in Fig. 1. In order to secure this result, a socket 16 is formed at the forward end of the platform 15, a weight 17 being secured in the socket. When an animal treads on the rear end of the platform 15 (the latch mechanism hereinafter described having been released), the rear end of the platform tilts downwardly until it rests on the stop 12, as shown in dotted line in Fig. 2, the animal being dumped into the receptacle 1, where the animal will be drowned in the water 2: or from which the animal may be removed for destruction otherwise, if the receptacle does not contain water.

Referring to the lower part of Fig. 4, it will be noted that, at its rear end, the platform 15 has a reduced neck 18 provided with a transverse head 19, there being an elongated slot 20 located partly in the neck and partly in the platform. The outer portion of the neck 18 is rolled to form a tubular bearing 21, a roller 22 being journaled in the bearing 21, and the roller being exposed through an opening 24 formed partly in the platform 15 and partly in the neck 18 and in the bearing 21, the opening resulting from the slot 20 in the blank, shown in Fig. 4.

The ends of the head 19 are curved forwardly to form retainers 23, which hold the roller 22 for rotation in the tubular bearing 21. The roller is exposed in part through the opening 24. A U-shaped trigger housing 25 is supplied, and has outwardly extended, rectangularly disposed wings 26 seated against the rear surface of the wall 7. The wings 26 have forwardly presented tongues 27 extended through the slots 10 in the wall 7 and clinched down on the forward surface of the wall, as in Fig. 2, the trigger housing 25 thus being held assembled with the wall 7.

In the trigger housing 25 is located a vertical trigger 28, in the form of a bar, provided intermediate its ends with a rearwardly projecting weight 29. At the upper end of the trigger 28 is secured a transverse shaft 30, which is mounted to rock in the side walls of the trigger housing 25 at its lower end, the trigger 28 has a pointed foot 31, including a transverse shoulder 32 and a downwardly inclined surface 33, leading rearwardly from the shoulder 32. The lower end of the trigger 28 projects downwardly through the extension 6 of the opening 5 in the platform 3, as disclosed in Fig. 2. The trigger 28 is supplied, between the weight 29 and the shaft 30, with a forwardly presented arm 34 extended through the hole 9 in the wall 7, the arm 34 being supplied at its forward end with a transverse bracket 35.

The numeral 36 marks a bait receptacle which is triangular in cross section, open at its ends, and provided with an aperture 37 in its lower wall. The rear wall of the bait receptacle 36 extends downwardly below the lower wall or bottom of the bait receptacle, to form a shank 38 seated detachably within the bracket 35 on the arm 34 of the trigger 28.

The numeral 39 designates an inverted U-shaped enclosure member, including side walls 40, resting at their lower edges on the lid or support 3, the forward edges of the walls 40 being downwardly and forwardly inclined as shown at 41. At their forward ends, the side walls 40 of the enclosure member 39 are supplied with reduced fingers 42 having openings 43 adapted to receive the shaft 14 which connects with the tiltable platform 15 with the lid or support 3. The shaft 14, therefore, exercises a double function, in that it forms a mounting for the platform 15 and also constitutes a means whereby the enclosure member 39 is held in place. The enclosure member 39 is closed at its rear end by the wall 7 of the platform 15. The bait receptacle 36 is located within the enclosure member 39. When it is desired to place bait in the bait receptacle 36, the enclosure member 39 may be swung forwardly with the shaft 14 as a center or axis of swinging movement, the bait receptacle 36 thus being made readily accessible. The bait in the receptacle 36 extends downwardly through the aperture 37 in the bottom of the bait receptacle, as disclosed in Fig. 2.

The weight 29 on the trigger 28 tends to swing the trigger forwardly at its lower end, until the shoulder 32 on the trigger is engaged beneath the roller 22 of the platform 15. The platform, thus, is held in the substantially horizontal position of Fig. 2. An animal enters the enclosure member 39 and treads upon the rear end of the platform 15. When the animal grabs the bait in the receptacle 36, the trigger 28 is caused to swing rearwardly to the dotted line position of Fig. 2, the shoulder 32 being detached from beneath the roller 22 on the inner end of the platform 15. The platform 15, overbalanced by the weight of the animal, swings downwardly until the platform comes into engagement with the stop tongue 12, and the animal is discharged into the water 2 in the receptacle or tank 1. In this connection it will be observed that the tank 1 is broken away in Fig. 2, thereby making it manifest that the tank may be of any desired depth, the tank being shown as of little height in Fig. 2, in order to save space in the drawings.

As soon as the animal is clear of the rear end of the platform 15, the trigger 28 swings forwardly to the vertical position of Fig. 2, under the action of the weight 29, and the inclined surface 33 of the trigger is disposed in the path of the roller 22 on the rear end of the platform 15. When, under the impulse of the weight 17 or its equivalent, the platform 15 swings to the approximately horizontal position of Fig. 2, the roller 22 rides with little friction along the edge 33 of the trigger 28, and then engages above the shoulder 32, the parts being restored to the set position depicted in solid lines in Figs. 1 and 2 of the drawings.

The device is simple in construction but it will be found thoroughly advantageous for the ends in view. Noting the detailed showing of the various parts in Fig. 4, it will be observed that they may be formed out of sheet metal at trifling expense, and in an automatic machine, the cost of the trap being such that the article may be sold at a small price.

It will be understood that the parts shown in Fig. 4 may be made and offered for sale as articles of manufacture, the maker being left to do the assembling. The platform, in the blank form disclosed near the bottom of Fig. 4, therefore, constitutes a complete article of manufacture.

Having thus described the invention, what is claimed is:

1. A trap comprising a support having an opening, a tiltable platform movable through the opening, a shaft carrying the platform for tilting movement and assembled with the support, and an enclosure member cooperating with the support, the support having a wall closing the rear end of the enclosure member, a trigger mounted for swinging movement, the trigger comprising a part which engages the platform detachably, to hold the platform in an approximately horizontal position, the trigger embodying a bait carrying means extended through the wall and located within the enclosure member, the enclosure member being pivotally mounted on the shaft, whereby the enclosure member may be swung forwardly away from the wall, thereby to expose the bait carrying means.

2. A trap comprising a support having an opening, a tiltable platform carried by the support and movable through the opening, and an enclosure member pivotally mounted at its forward end on the support, the support being provided with a fixed upstanding wall forming a closure for the rear end of the enclosure member, a trigger housing carried by the wall, a trigger pivotally mounted in the trigger housing, the trigger having means for engaging the platform releasably, to hold the platform in an approximately horizontal position, and the trigger having bait holding means extended through the wall and located in the enclosure member, the enclosure member being forwardly movable away from the wall, thereby to expose the bait holding means.

3. An article of manufacture, for use in the making of a trap, comprising a platform provided at one end with a reduced neck having a transverse head at its outer end, and the ends of the head being bendable, the neck and the adjacent portion of the platform having an opening elongated in the direction of the length of the platform.

EDWARD L. ALLEN.